Sept. 30, 1969  R. E. COONS  3,469,525
FRUIT SEGMENT SQUEEZER
Filed Feb. 15, 1968
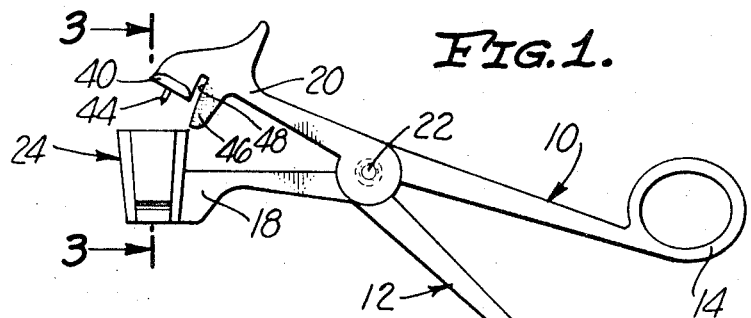
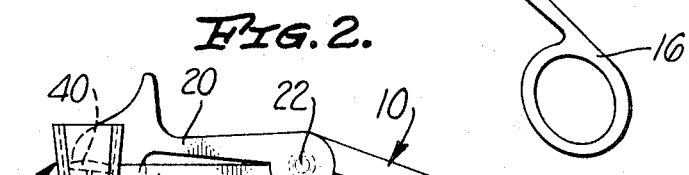
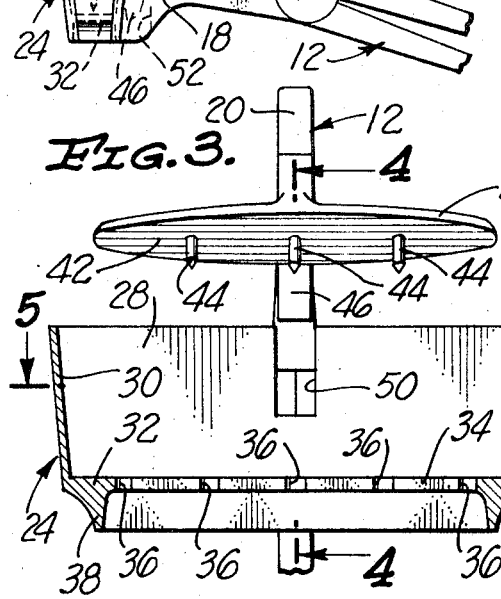
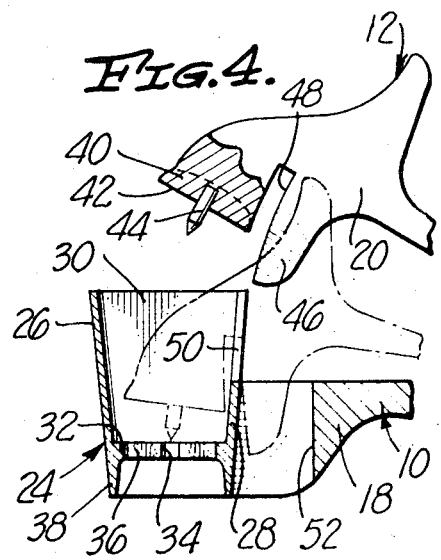
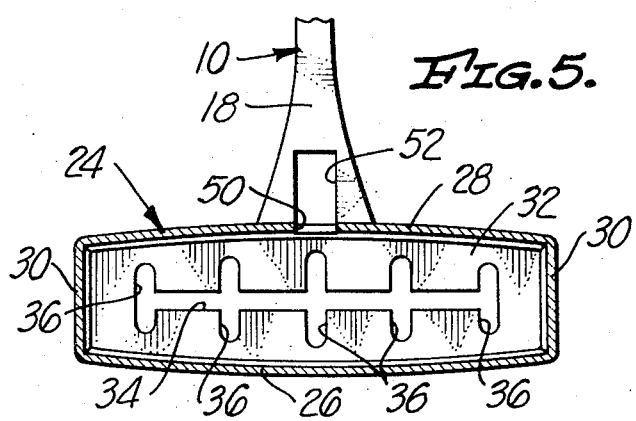
INVENTOR
ROYAL E. COONS
BY
MAHONEY & HORNBAKER
ATTORNEYS

United States Patent Office 3,469,525
Patented Sept. 30, 1969

3,469,525
FRUIT SEGMENT SQUEEZER
Royal E. Coons, 306A Park St.,
Alhambra, Calif. 91801
Filed Feb. 15, 1968, Ser. No. 705,795
Int. Cl. B30b 7/00; A47j 17/04, 19/02
U.S. Cl. 100—234                                8 Claims

ABSTRACT OF THE DISCLOSURE

A lower lever working end of scissor-connected levers has a transversely elongated cup with a perforate bottom adapted for receiving a mating squeezing plate of an upper lever working end downwardly therein. The cup and lever working ends have interfitting slots and projections permitting full movement of the squeezing plate into the cup while preventing fruit juice escape, and the cup is downwardly flanged below the perforate bottom for proper direction of said juice. The perforations of the cup perforate bottom are patterned in elongated slots to minimize clogging during the squeezing operation.

BACKGROUND OF THE INVENTION

This invention relates to a fruit segment squeezer of the type having scissor-connected levers mounting a transversely elongated, fruit segment receiving cup and a squeezing plate adapted for downward reception into the cup for the squeezing of juice from the fruit segment. More particularly, this invention relates to a fruit segment squeezer of the foregoing general character having particularly formed and co-operating slots and a projection for permitting full movement of the squeezing plate into the segment receiving cup, while at the same time, preventing the inadvertent side escape of juice from said cup during the squeezing operation.

Furthermore, the present invention provdes a particularly formed segment receiving cup in a fruit segment squeezer of the foregoing general character having a specific form of flange means projecting downwardly below a perfrate bottom of the cup for properly directing juice downwardly into a receiving container, said cup perforate bottom also having specifically formed performations therein to minimize clogging during the squeezing operation.

Many prior fruit juice squeezers have been provided, certain of which have been adapted for merely squeezing the juice from fruit segments, rather than the entire fruit, such as a lemon or the like. Furthermore, certain of the prior fruit segment squeezers have been, from the board standpoint, of the scissor-connected lever type adapted for hand holding and manipulation. Prior to the present invention, however, all of these specific forms of hand held, scissor-connected lever type segment squeezers have included various inherent difficulties and disadvantages making the same somewhat objectionable.

One of the major difficulties with the prior scissor-type segment squeezers has been occasioned by the fact that the prior segment squeezers have not provided interfitting segment cups and squeezer plates, necessary for the squeezing function, which have guarded sufficiently against juice escape during the squeezing operation. The problem presented is that in order to properly squeeze the fruit segment and force the maximum of juice therefrom, it is necessary that the squeezer plate will sufficiently penetrate the confines of the squeezer cup, while at the same time, remain mounted on an end of one of the scissor-connected levers. This has resulted in the necessity of providing various openings through sidewalls of the squeezer cup through which juice can escape during said squeezing operation, and this is particularly true if any true compactness is to be provided in the overall squeezer construction.

Thus, one is presented with the dilemma of either presenting a squeezer construction having an objectionable overall height, or a squeezer construction having an acceptable reduced height but permitting a certain amount of juice escape at the cup sides during the squeezing operation. If the fruit segment receiving cup is to have unbroken sidewalls, the connection to the squeezing plate must necessarily extend upwardly a sufficient distance to clear the cup sidewalls, even though the squeezer plate is fully within the cup. On the other hand, if the overall squeezer construction is to be reduced in height to a more acceptable form, clearance openings in the squeezer cup sidewalls must be tolerated, through which, with the prior constructions juice being forced from the fruit segment can escape.

A further major difficulty with the prior fruit segment squeezer constructions has been the fact that sufficient provision has not been made for directing the juice properly downwardly from the squeezer cup perforate bottom in order to properly direct said juice downwardly into a container, such as a glass. If the perforations in the cup perforate botttom are made sufficiently large to prevent objectionable clogging, the fruit segment juice during the squeezing operation can be forced at all angles from said cup bottom, thereby completely missing the container within which it is desired to deposit the same. In one attempt to cure this particular difficulty, a relatively large bottom closure for the cup beneath the perforate bottom thereof has been provided, ultimately narrowing to a small bottom opening, again resulting in a large and objectionable increase in the overall height of the squeezer construction.

OBJECTS AND SUMMARY OF THE INVENTION

It is, therefore, an object of my invention to provide a fruit segment squeezer of the hand held, scissor-connected lever type wherein the overall height of said squeezer is maintained at a minimum by the inclusion of openings through the squeezer cup sidewall for the reception of portions of the lever mounting the squeezer plate to enter therein during the squeezing operation, yet complete guards are provided to prevent the undesired escape of fruit juices during said squeezing operation.

According to the preesnt invention, the squeezer cup and the various levers thereof are provided with uniquely co-operating slots and a projection, said projection serving to completely cover and guard an opening through the squeezer cup sidewall, preventing the juice from escaping therethrough. The co-operating slots and projection, however, still permit full penetration of the squeezer plate into the squeezer cup so that the overall height of the squeezer may be maintained at a minimum.

It is a further object of my invention to provide a fruit segment squeezer of the foregoing general character wherein juice passing through the cup perforate bottom during the squeezing operation is effectively directed downwardly into a container positioned below the squeezer and is not permitted to pass at a multiplicity of angles therefrom. The foregoing object is accomplished by providing the squeezer cup with a downwardly projecting flange circumscribing the cup perforate bottom and projecting downwardly from said bottom. Said flange is of minimum height, yet due to the particular formation thereof, effectively serves the juice directing function.

It is still a further object of the present invention to provide a fruit segment squeezer of the foregoing general character wherein particularly formed perforations are presented in the squeezer cup perforate bottom which minimize the danger of undesired clogging. Not only are said perforations formed of elongated slot construction in a particular unique pattern for providing the maximum desired attributes, but also, the slot-like configuration provides juice passage openings which tend to permit a freer flow of the liquid juice therethrough and more directly downwardly. Such free flow attributes of the slotted openings, in addition to the previously alluded to downward flange circumscribing the cup perforate bottom, combine to insure downward direction of said juice into the underlying intended container.

Other objects and advantages of the invention will be apparent from the following specification and the accompanying drawing which is for the purpose of illustration only.

BRIEF DESCRIPTION OF THE DRAWING

FIG. 1 is a side elevational view of an embodiment of fruit segment squeezer incorporating the principles of the present invention and showing the segment squeezer in an open position ready for the reception of a fruit segment therein;

FIG. 2 is a fragmentary, side elevational view similar to FIG. 1, but showing the segment squeezer in closed, squeezing position;

FIG. 3 is an enlarged, fragmentary, vertical, sectional view looking in the direction of the arrows 3—3 in FIG. 1;

FIG. 4 is a fragmentary, vertical, sectional view looking in the direction of the arrows 4—4 in FIG. 3; and FIG. 5 is a fragmentary, horizontal, sectional view looking in the direction of the arrows 5—5 in FIG. 3.

DESCRIPTION OF THE BEST EMBODIMENT CONTEMPLATED

Referring to the drawing, an embodiment of the fruit segment squeezer of the present invention is shown as including a pair of scissor-connected, longitudinally extending levers, generally indicated at 10 and 12, having rearward common operating ends 14 and 16 and forward common working ends 18 and 20. In view of the scissor connection of the levers 10 and 12 in the usual fashion, lever 10 toward the working end 18 thereof crosses downwardly by the lever 12 at a pivot 22 so that bringing the operating ends 14 and 16 of the levers vertically together causes the respective working ends 18 and 20 of said levers to likewise move vertically together. Also as a result of such scissor connection, the working end 18 of the lever 10 becomes a lower lever working end and the working end 20 of the lever 12 becomes an upper lever working end.

A transversely elongated, segment receiving cup, generally indicated at 24, is secured to the lower working end 18 of the lever 10, said cup being nearly generally rectangular in horizontal cross section having upstanding forward and rearward sides 26 and 28, ends 30 and a generally horizontal perforate bottom 32. The segment receiving cup 24 is secured to the lower lever working end 18 midway of and at the lower portion of the cup rearward side 28, as best seen in FIGS. 4 and 5.

As probably best seen in FIG. 5 in plan view, the perforate bottom 32 of the segment receiving cup 24 is formed with a single transverse slot 34 extending substantially longitudinally midway of said perforate bottom and the major portion of the transverse length thereof. Further, a series of longitudinally or forwardly and rearwardly extending transversely spaced slots 36 are formed intersecting the main or transversely elongated slot 34 extending longitudinally thereacross. The result is that the perforate bottom 32 has combined transverse and longitudinal slots 34 and 36 providing an appreciable opening through said bottom for the free passage of fruit juice downwardly therethrough in substantially a vertical direction, while still preventing undesired seeds and fruit pulp from passing downwardly therethrough.

Also, a relatively short, generally vertical flange 38 is formed projecting downwardly from the cup perforate bottom 32, said flange circumscribing said perforate bottom. As shown in FIGS. 3 and 4, said flange 38 at the inner sides thereof flares or angles outwardly in its downward extension. Furthermore, it will be noted that the vertical dimensions of said flange 38 are only a minor fraction of the vertically upward extension of the cup sides and ends 26, 28 and 30, so that said flange does not add appreciably to the overall height of the segment receiving cup 24.

A downwardly exposed, transversely elongated squeezing plate 40 is secured at a transverse midpoint to the upper lever working end 20 of the lever 12 positioned aligned for downward reception into the segment receiving cup 24 when the levers 10 and 12 are brought together, as shown in FIG. 2. The squeezing plate 40 has a flat, downwardly facing squeezing surface 42 and preferably three, downwardly extending, transversely spaced pins 44. Thus, movement of the squeezing plate 40 downwardly into the segment receiving cup 24 will squeeze a fruit segment downwardly against the cup perforate bottom 32, while at the same time, the pins 44 will penetrate the usually upwardly positioned rind of said fruit segment so that subsequent removal of the squeezing plate from the cup will remove the remains of the fruit segment therewith for later easy disposal from said squeezing plate.

A downwardly extending projection 46 is formed on the upper lever working end 20 spaced longitudinally rearwardly of the squeezing plate 40 by a downwardly opening slot 48. It will be noted that the squeezing plate 40 is not only located spaced forwardly of said downward projection 46, but also intermediate the downward extension of said projection. Furthermore, the downwardly opening slot 48 is of sufficient longitudinal width for receiving a lower portion of the cup rearward side 28 therein upon the squeezing plate 40 being moved downwardly into the segment receiving cup 24, as will hereinafter more clearly explained.

An upwardly opening slot 50 is formed through the rearward side 28 of the segment receiving cup 24 vertically aligned with the lower lever working end 18 of the lever 10 and terminating downwardly at said lower lever working end. A still further slot 52 is formed downwardly through said lower lever working end 18 immediately longitudinally rearwardly of the cup rearward side 28, as best seen in FIGS. 4 and 5, said latter slot 52 being vertically aligned for reception of the downward projection 46 on the upper lever working end 20 when the squeezing plate 40 is brought downwardly into the segment receiving cup 24, as shown in hidden lines in FIG. 2 and phantom lines in FIG. 4.

The cup upwardly opening slot 50 and the slot 52 through the lower lever working end 18 are transversely dimensioned for reception of the upper lever working end 20 and downward projection 46 respectively therein when the squeezing plate 40 is moved downwardly into the segment receiving cup 24, and it will be particularly noted that the downward projection 46 nearly transversely approaches the transverse width of the cup inwardly opening slot 50 so that said projection longitudinally rearwardly covers and closes said cup upwardly opening slot during the downward movement of the sequeezing plate within the segment receiving cup.

Thus, with a fruit segment positioned within the segment receiving cup 24, the squeezing plate 40 may be brought downwardly into the segment receiving cup for squeezing said fruit segment downwardly against the cup perforate bottom 32. Initially, the downward projection 46 of the upper lever working end 20 will begin downward penetration into the slot 52 of the lower lever working end 18, while at the same time rearwardly closing the cup upwardly opening slot 50, preventing fruit juice from passing therethrough. In the final stages of squeezing the fruit segment, the portion of the upper lever working end 20 immediately above the downwardly opening slot 48 thereof will be received in the cup upwardly opening slot 50 and the lower portion of the cup rearward side 28 immediately longitudinally forwardly of the lower lever working end 18 will begin to be received within the downwardly opening slot 48 of the upper lever working end 20.

In this manner, the squeezing plate 40 effectively penetrates downwardly into the segment receiving cup 24 while still maintaining the vertical dimensions of the upper lever working end 20 at a minimum and also while still preventing rearward leakage of fruit juices through the cup rearward side 28. Additionally, during said squeezing, the unique formation of the transverse and longitudinal slots 34 and 36 in the cup perforate bottom 32 permits the free flow of fruit juices downwardly through said perforate bottom while blocking the passage of seeds and undesirable pulp therethrough.

Finally, the circumscribing flange 38 on the lower portion of the segment receiving cup 24 downwardly of the cup perforate bottom 32 likewise directs said fruit juices downwardly into an underlying container, said flange 38 being of minimum vertical height so as to not appreciably increase the overall height of the segment receiving cup.

I claim:

1. In a fruit segment squeezer for squeezing juice from fruit segments, the combination of: a pair of scissor-connected, longitudinally extending levers having common operating ends and common working ends; a transversely elongated, segment receiving cup secured through a cup back wall to a lower of said lever working ends, said cup having a perforate bottom closure, a downwardly extending flange on said cup projecting downwardly from and circumscribing said cup bottom, the downward extension of said flange from said cup bottom being only a minor fraction of an upward extension of cup walls above said cup bottom; and a transversely elongated, squeezing plate on said upper lever working end positioned aligned with and moving downwardly into said segment receiving cup toward said cup bottom upon said upper and lower lever working ends being moved together.

2. A fruit segment squeezer as defined in claim 1 in which inner surface of said cup flange flare outwardly in said downward extension of said flange.

3. A fruit segment squeezer as defined in claim 1 in which said cup perforate bottom includes a transversely elongated slot extending continuously throughout a major portion of said cup bottom transverse extension, a series of transversely spaced and longitudinally extending slots crossing said transverse slot.

4. A fruit segment squeezer as defined in claim 1 in which inner surfaces of said cup flange flare outwardly in said downward extension of said flange; and in which said cup perforate bottom includes a transversely elongated slot extending continuously throughout a major portion of said cup bottom transverse extension, a series of transversely spaced and longitudinally extending slots crossing said transverse slot.

5. A fruit segment squeezer as defined in claim 1 in which an upwardly opening slot is formed through said cup back wall terminating downwardly at said lower lever working end, said slot being located transversely midway of said cup back wall and longitudinally aligned with said lower lever working end; in which a slot is formed downwardly through said lower lever working end rearwardly adjacent said cup back wall generally longitudinally aligned with said cup back wall slot; and in which a downwardly extending projection is formed on said upper lever working end positioned aligned with and moving downwardly into said slot of said lower lever working end upon said upper and lower working ends being moved together, said projection substantially rearwardly covering and closing said cup back wall slot during said lever working end movement.

6. In a fruit segment squeezer for squeezing juice from fruit segments, the combination of: a pair of scissor-connected, longitudinally extending levers having common operating ends and common working ends; a transversely elongated, segment receiving cup secured through a cup back wall to a lower of said lever working ends, said cup having a perforate bottom closure, an upwardly opening slot formed through said cup back wall terminating downwardly at said lower lever working end, said slot being located transversely midway of said cup back wall and longitudinally aligned with said lower lever working end; a slot downwardly through said lower lever working end rearwardly adjacent said cup back wall generally longitudinally aligned with said cup back wall slot; a downwardly extending projection on said upper lever working end positioned aligned with and moving downwardly into said slot of said lower lever working end upon said upper and lower lever working ends being moved together, said projection substantially rearwardly covering and closing said cup back wall slot during said lever working end movement; and a transversely elongated squeezing plate on said upper lever working end spaced longitudinally forwardly of said projection positioned aligned with and moving downwardly into said segment receiving cup toward said cup bottom during said lever working end movement.

7. A fruit segment squeezer as defined in claim 6 in which said squeezing plate on said upper lever working end is aligned intermediate said downward extension of said projection with a downwardly opening slot being formed between said plate and said projection.

8. A fruit segment squeezer as defined in claim 6 in which a downwardly extending flange is formed on said cup projecting downwardly from and circumscribing said cup bottom, the downward extension of said flange from said cup bottom being only a minor fraction of an upward extension of cup walls above said cup bottom; in which inner surfaces of said cup flange flare outwardly in said downward extension of said flange; and in which said cup perforate bottom includes a transversely elongated slot extending continuously throughout a major portion of said cup bottom transverse extension, a series of transversely spaced and longitudinally extending slots crossing said transverse slot.

References Cited

UNITED STATES PATENTS

| 61,251 | 1/1867 | Reece et al. | 100—234 XR |
| 2,893,032 | 7/1959 | Selmer. | |

FOREIGN PATENTS

| 1,035,542 | 4/1953 | France. |

BILLY J. WILHITE, Primary Examiner

U.S. Cl. X.R.

146—3